US008840976B2

(12) United States Patent
Larson et al.

(10) Patent No.: US 8,840,976 B2
(45) Date of Patent: Sep. 23, 2014

(54) VOC OR COMPRESSED GAS CONTAINMENT DEVICE MADE FROM A POLYOXYMETHYLENE POLYMER

(75) Inventors: Lowell Larson, Independence, KY (US); Ursula Ziegler, Mainz-Kostheim (DE); Christopher McGrady, Wilder, KY (US)

(73) Assignee: Ticona LLC, Florence, KY (US)

( * ) Notice: Subject to any disclaimer, the term of this patent is extended or adjusted under 35 U.S.C. 154(b) by 649 days.

(21) Appl. No.: 12/904,575

(22) Filed: Oct. 14, 2010

(65) Prior Publication Data

US 2012/0091013 A1   Apr. 19, 2012

(51) Int. Cl.
| | |
|---|---|
| B29D 22/00 | (2006.01) |
| B29C 49/00 | (2006.01) |
| B60K 15/03 | (2006.01) |
| C08L 59/00 | (2006.01) |
| C08G 18/76 | (2006.01) |
| C08G 18/56 | (2006.01) |
| C08L 75/04 | (2006.01) |
| B29C 47/82 | (2006.01) |
| B29C 47/38 | (2006.01) |
| B29C 47/00 | (2006.01) |

(52) U.S. Cl.
CPC ....... B60K 15/03006 (2013.01); B29C 49/0005 (2013.01); C08L 75/04 (2013.01); C08L 59/00 (2013.01); B29C 47/822 (2013.01); C08G 18/7671 (2013.01); C08G 18/56 (2013.01); B29C 2947/92228 (2013.01); B29C 47/38 (2013.01); B29C 47/0014 (2013.01)
USPC .................. 428/35.7; 428/36.92; 525/399

(58) Field of Classification Search
CPC .. B29C 47/0014; B29C 47/38; B29C 47/822; B29C 2947/92228; B29C 49/0005; B60K 15/03006; C08G 18/7671; C08G 18/56; C08L 59/00; C08L 75/04
USPC ............... 428/35.7, 36.92; 206/0.6; 220/4.14; 525/399
See application file for complete search history.

(56) References Cited

U.S. PATENT DOCUMENTS

| | | | |
|---|---|---|---|
| 2,993,025 A | 7/1961 | Alsup et al. | |
| 3,161,616 A | 12/1964 | Brown et al. | |

(Continued)

FOREIGN PATENT DOCUMENTS

| | | |
|---|---|---|
| AU | 2148770 | 4/1972 |
| DE | 1158709 | 12/1963 |

(Continued)

OTHER PUBLICATIONS

Polyacetal resin composition having good surface-decorating property-comprising polyacetal resin, GP=II metal carbonate, phosphate or acetate, nitrogen-contg. Heterocycle and (co) polymer, DERWENT, 1982, XP002284755, the whole document.

(Continued)

Primary Examiner — N. Edwards
(74) Attorney, Agent, or Firm — Dority & Manning, P.A.

(57) ABSTRACT

VOC or compressed gas containment devices, such as polymer fuel tanks, are made from a polyoxymethylene polymer composition. The polymer composition contains a polyoxymethylene polymer that is directly or indirectly chemically attached to an impact modifier. In one embodiment, for instance, a coupling agent bonds the impact modifier to the polyoxymethylene polymer. In order to preserve the permeability of the polymer material when combined with the impact modifier, a polyoxymethylene polymer is used that contains a low level of low molecular weight constituents.

16 Claims, 4 Drawing Sheets

(56) References Cited

U.S. PATENT DOCUMENTS

| | | | |
|---|---|---|---|
| 3,161,617 A | 12/1964 | Kritzler et al. | |
| 3,269,988 A | 8/1966 | Braude et al. | |
| 3,340,234 A | 9/1967 | Brown, et al. | |
| 3,346,663 A | 10/1967 | Kern et al. | |
| 3,380,966 A | 4/1968 | Fouts | |
| 3,393,179 A | 7/1968 | Leverett et al. | |
| 3,642,940 A | 2/1972 | Burg et al. | |
| 3,865,284 A | 2/1975 | Kazama et al. | |
| 3,998,791 A | 12/1976 | Radici et al. | |
| 4,097,453 A | 6/1978 | Radici et al. | |
| 4,111,912 A | 9/1978 | Sextro et al. | |
| 4,169,867 A | 10/1979 | Burg et al. | |
| 4,195,158 A | 3/1980 | Burg et al. | |
| 4,431,794 A | 2/1984 | Sadlowski et al. | |
| 4,493,751 A | 1/1985 | Cherdron et al. | |
| 4,517,319 A | 5/1985 | Reske et al. | |
| 4,640,949 A * | 2/1987 | Wagman | 524/227 |
| 4,683,267 A | 7/1987 | Linder et al. | |
| 4,689,373 A * | 8/1987 | Auerbach et al. | 525/398 |
| 4,780,498 A | 10/1988 | Goerrissen et al. | |
| 4,795,477 A | 1/1989 | Kusumgar et al. | |
| 4,804,716 A | 2/1989 | Flexman, Jr. | |
| 4,828,755 A | 5/1989 | Kusumgar et al. | |
| 4,845,161 A | 7/1989 | Richardson | |
| 4,929,712 A | 5/1990 | Sugiyama et al. | |
| 4,950,773 A | 8/1990 | Monnier et al. | |
| 4,968,756 A | 11/1990 | Silvis et al. | |
| 4,975,518 A | 12/1990 | Broussard et al. | |
| 4,975,519 A | 12/1990 | Yang et al. | |
| 4,978,725 A | 12/1990 | Reske et al. | |
| 4,996,253 A | 2/1991 | Mulholland | |
| 5,004,784 A | 4/1991 | Huynh-Ba | |
| 5,004,798 A | 4/1991 | Broussard et al. | |
| 5,039,741 A * | 8/1991 | Burg et al. | 525/64 |
| 5,043,398 A | 8/1991 | Auerbach et al. | |
| 5,143,982 A | 9/1992 | Niino | |
| 5,144,005 A | 9/1992 | Sextro et al. | |
| 5,173,532 A | 12/1992 | Endo et al. | |
| 5,183,860 A | 2/1993 | Kashihara | |
| 5,206,308 A | 4/1993 | Auerbach et al. | |
| 5,286,807 A * | 2/1994 | Flexman, Jr. | 525/399 |
| 5,288,840 A | 2/1994 | Morishita et al. | |
| 5,292,824 A | 3/1994 | Nagai et al. | |
| 5,310,822 A | 5/1994 | Kielhorn-Bayer et al. | |
| 5,326,846 A | 7/1994 | Nagai et al. | |
| 5,380,724 A | 1/1995 | Zubovics et al. | |
| 5,530,061 A | 6/1996 | Sanada et al. | |
| 5,541,284 A | 7/1996 | Arnoldi et al. | |
| 5,587,449 A | 12/1996 | Fleischer et al. | |
| 5,599,860 A | 2/1997 | Memon et al. | |
| 5,608,030 A | 3/1997 | Hoffmockel et al. | |
| 5,834,542 A | 11/1998 | Kielhorn-Bayer et al. | |
| 5,837,744 A | 11/1998 | Nagashima et al. | |
| 5,852,135 A | 12/1998 | Kanai et al. | |
| 5,859,131 A | 1/1999 | Ishiura et al. | |
| 5,866,670 A | 2/1999 | Nakai et al. | |
| 5,910,540 A | 6/1999 | Takahashi | |
| 5,919,849 A | 7/1999 | Memon et al. | |
| 5,942,593 A | 8/1999 | Pudleiner et al. | |
| 5,959,036 A | 9/1999 | Yahiro et al. | |
| 5,962,623 A | 10/1999 | Eckardt et al. | |
| 6,187,859 B1 | 2/2001 | Humphrey et al. | |
| 6,271,302 B1 | 8/2001 | Matsushima | |
| 6,312,828 B1 | 11/2001 | Akao | |
| 6,388,049 B1 | 5/2002 | Yokoyama et al. | |
| 6,433,106 B1 | 8/2002 | Mori et al. | |
| 6,441,056 B2 | 8/2002 | Keller | |
| 6,489,388 B1 | 12/2002 | Kurz et al. | |
| 6,506,850 B1 | 1/2003 | Tamimura et al. | |
| 6,512,047 B2 | 1/2003 | Kim et al. | |
| 6,559,266 B2 | 5/2003 | Kaufhold et al. | |
| 6,706,807 B2 | 3/2004 | Kaufhold et al. | |
| 6,821,630 B2 | 11/2004 | Takada et al. | |
| 6,872,775 B2 | 3/2005 | Greulich et al. | |
| 6,936,651 B2 | 8/2005 | Flexman | |
| 6,969,651 B1 | 11/2005 | Lu et al. | |
| 7,008,986 B2 | 3/2006 | Dames et al. | |
| 7,041,718 B2 | 5/2006 | Harashina et al. | |
| 7,138,175 B2 | 11/2006 | Saito | |
| 7,169,887 B2 | 1/2007 | Papke | |
| 7,223,809 B2 | 5/2007 | Notorgiacomo | |
| 7,329,695 B2 | 2/2008 | Tucker et al. | |
| 7,618,714 B2 | 11/2009 | Ziegler et al. | |
| 7,644,657 B1 | 1/2010 | Clark et al. | |
| 7,645,822 B2 | 1/2010 | Assmann et al. | |
| 7,745,548 B2 | 6/2010 | Zierer et al. | |
| 7,812,110 B2 | 10/2010 | Haubs et al. | |
| 7,829,610 B2 | 11/2010 | Papke | |
| 7,858,202 B2 | 12/2010 | Prigandt et al. | |
| 7,863,393 B2 | 1/2011 | Assmann et al. | |
| 7,906,594 B2 | 3/2011 | Muck et al. | |
| 7,915,350 B2 | 3/2011 | Schmalz et al. | |
| 7,943,726 B2 | 5/2011 | Haubs et al. | |
| 8,008,390 B2 | 8/2011 | Gunnewig et al. | |
| 8,128,845 B2 | 3/2012 | Moraczewski et al. | |
| 8,236,430 B2 | 8/2012 | Ziegler et al. | |
| 2003/0148117 A1 | 8/2003 | Takada et al. | |
| 2004/0118509 A1 | 6/2004 | Flexman et al. | |
| 2004/0121175 A1 | 6/2004 | Flexman et al. | |
| 2004/0157959 A1 | 8/2004 | Turgis et al. | |
| 2004/0228971 A1 | 11/2004 | Scaramuzzino | |
| 2005/0043492 A1 | 2/2005 | Chin et al. | |
| 2005/0107513 A1 | 5/2005 | Papke | |
| 2005/0131124 A1 | 6/2005 | Philippoz et al. | |
| 2005/0156351 A1 | 7/2005 | Straus et al. | |
| 2005/0173433 A1 | 8/2005 | Spahr | |
| 2006/0111507 A1 | 5/2006 | Papke | |
| 2006/0151505 A1 | 7/2006 | Kobayashi | |
| 2006/0175325 A1 * | 8/2006 | Day | 220/4.14 |
| 2006/0252912 A1 | 11/2006 | Hoffmocket et al. | |
| 2007/0010633 A1 | 1/2007 | Park et al. | |
| 2007/0049685 A1 | 3/2007 | Hansel et al. | |
| 2007/0154727 A1 | 7/2007 | Ziegler et al. | |
| 2007/0202332 A1 | 8/2007 | Gunnewig et al. | |
| 2007/0264514 A1 | 11/2007 | Prigandt et al. | |
| 2008/0029934 A1 | 2/2008 | Ziegler et al. | |
| 2008/0214748 A1 | 9/2008 | Assmann et al. | |
| 2009/0151707 A1 | 6/2009 | Davis et al. | |
| 2009/0189314 A1 | 7/2009 | Peerlings et al. | |
| 2009/0220719 A1 * | 9/2009 | Klug et al. | 428/36.92 |
| 2009/0264583 A1 | 10/2009 | Kurz et al. | |
| 2009/0283931 A1 | 11/2009 | Pfeiffer et al. | |
| 2011/0086952 A1 | 4/2011 | Bessho et al. | |
| 2011/0195148 A1 | 8/2011 | Mentink et al. | |
| 2012/0091013 A1 * | 4/2012 | Larson et al. | 206/6 |
| 2012/0276314 A1 * | 11/2012 | Latz et al. | 428/35.7 |
| 2013/0082064 A1 * | 4/2013 | Larson et al. | 220/600 |

FOREIGN PATENT DOCUMENTS

| | | |
|---|---|---|
| DE | 4436107 A1 | 4/1996 |
| DE | 196 33 708 A1 | 2/1997 |
| DE | 10003370 | 8/2001 |
| DE | 10 2005 016 130 A1 | 10/2006 |
| EP | 0 115 846 A2 | 2/1984 |
| EP | 0 108 324 A | 5/1984 |
| EP | 0108 324 A | 5/1984 |
| EP | 0137305 A2 | 4/1985 |
| EP | 0 156 285 A2 | 10/1985 |
| EP | 0276080 A1 | 7/1988 |
| EP | 0 397 492 A2 | 11/1990 |
| EP | 0 397 493 A2 | 11/1990 |
| EP | 0 397 494 A2 | 11/1990 |
| EP | 0 398 585 A2 | 11/1990 |
| EP | 0 400 827 A2 | 12/1990 |
| EP | 0511412 | 4/1991 |
| EP | 0 504 405 A1 | 9/1992 |
| EP | 0565304 | 4/1993 |
| EP | 0354802 A1 | 7/1993 |
| EP | 0420564 B1 | 10/1994 |
| EP | 0654501 | 11/1994 |
| EP | 0 716 105 A2 | 6/1996 |
| EP | 0 999224 A | 5/2000 |
| EP | 0999224 A | 5/2000 |

(56) References Cited

FOREIGN PATENT DOCUMENTS

| | | |
|---|---|---|
| EP | 0992541 B1 | 9/2004 |
| EP | 1 869 121 B1 | 9/2009 |
| GB | 1017244 | 7/1962 |
| GB | 1009881 | 11/1965 |
| GB | 1009884 | 11/1965 |
| GB | 1331829 | 9/1973 |
| GB | 1335806 | 10/1973 |
| GB | 1377083 | 12/1974 |
| GB | 1444789 | 8/1976 |
| GB | 1 524 440 A | 9/1978 |
| GB | 524440 A | 9/1978 |
| GB | 1524410 A | 9/1978 |
| GB | 1524410 A1 | 9/1978 |
| GB | 1590549 | 6/1981 |
| JP | S4741120 | 12/1972 |
| JP | 3 284675 | 12/1991 |
| JP | 4/114003 A | 4/1992 |
| JP | 4114003 A | 4/1992 |
| JP | 4/145114 | 5/1992 |
| JP | 4145114 | 5/1992 |
| JP | 05-059255 A | 3/1993 |
| JP | 5/59255 A | 3/1993 |
| JP | 6 179673 | 6/1994 |
| JP | 7 010871 | 1/1995 |
| JP | 7 033766 | 2/1995 |
| JP | 2000-154181 | 6/2000 |
| JP | 2003-147161 | 5/2003 |
| JP | 2004204051 | 7/2004 |
| JP | 2012077258(A) | 4/2012 |
| WO | 03/050187 | 6/2003 |
| WO | WO 03050187 | 6/2003 |
| WO | 2004/065444 | 5/2004 |
| WO | WO 2004065444 | 5/2004 |
| WO | 2005/012380 A1 | 2/2005 |
| WO | WO 2005/012380 A1 | 2/2005 |
| WO | 2006-089915 | 8/2006 |
| WO | WO 2006-089915 | 8/2006 |
| WO | 2006/097486 | 9/2006 |
| WO | WO 2006/097486 | 9/2006 |
| WO | WO 2006/105918 A1 | 10/2006 |
| WO | 2006/105918 | 12/2006 |
| WO | WO 2006/105918 | 12/2006 |
| WO | 2007/073873 A1 | 5/2007 |
| WO | 2007/073874 A1 | 5/2007 |
| WO | WO 2007/073873 A1 | 5/2007 |
| WO | WO 2007/073874 A1 | 5/2007 |

OTHER PUBLICATIONS

Braun et al., "Influences of structural parameters on the dynamic mechanical properties of polyacetals", *Die Arrgewandte Makromolekulare Chemie* 228 (1995), pp. 185-200 (Nr. 4030).

Grohn, et al., "Ueber den Zusammenhang Zwischen der Molekulargewichtsverteilung und den Mechanischen Eigenschaften von Polyoxymethylendiazetaten", Plaste und Kautschuk, Leipzig, DE, Bd. 14, Nr. 11, Jan. 1, 1967, Seiten 795-797.

Kawaguchi et al, "Tensile Behavior of Glass-Fiber-Filled Polyacetal: Influence of the Functional Groups of Polymer Matrices", Journal of Applied Polymer Science, vol. 107, pp. 667-673 (2008).

Kobayashi et al., "Molecular Weight Distribution of Polyoxymethylene Obtained in Solid-State Polymerization of Trioxane Catalyzed by $BF_3O(C_2H_5)_2$", J. Macromol. Sci.—Chem., A1(8), pp. 1519-1529, Dec. 1967 (abstract only).

Mehrabzadeh et al., "Impact Modification of Polyacetal by Thermoplastic Elastomer Polyurethane", Journal of Applied Polymer Science, vol. 84, 2573-2582 (2002).

Penczek, et al., Cationic Ring-Opening Polymerization, p. 122.

Saechtling, Kunststoff-TASchenbuch [Plastics Handbook], Hanser Verlag, 27th Ed. 1998, pp. 202-217.

Co-pending U.S. Appl. No. 13/433,517, Guido Latz, filed Mar. 29, 2012.

Co-pending U.S. Appl. No. 13/879,360, Larson, et al., filed Apr. 12, 2013.

Search Report and Written Opinion for Application No. PCT/2011/056252, dated Dec. 22, 2011.

Co-pending U.S. Appl. No. 12/423,671, Klaus Kurz, et al., filed Apr. 14, 2009.

Chujo et al., "Reversible Gelation of Polyoxazoline by Means of Diels-Alder Reaction", Macromolecules (1990), 23, 2636-2641.

Co-pending U.S. Appl. No. 13/631,072, Lowell Larson, filed Sep. 28, 2012.

Co-pending U.S. Appl. No. 13/721,268, Malvika Bihari, filed Dec. 20, 2012.

Co-pending U.S. Appl. No. 14,135,699, Bruce Mulholland, filed Dec. 20, 2013.

Braun et al., Influences of structural parameters on the dynamic mechanical properties of polyacetals, Die Arrgewandte Makromolekulare Chemie 228 (1995), pp. 185-200 (Nr. 4030).

Ishida, "Polymerization of Formaldehyde and the Physical Properties of the Polymerization Products, I", Journal of Applied Polymer Science, vol. 26, pp. 2743-2750 (1981).

Kawaguchi et al, Tensile Behavior of Glass-Fiber-Filled Polyacetal:Influence of Functional Groups Polymer Matrices, Journal of Applied Polymer Science, vol. 107, pp. 667-673—2008.

Penczek, et al., Cationic Ring-Opening Polymerization, p. 122, Published 1980.

Kobayashi et al., Molecular Weight Distribution Polyoxymethylene Obtained Solid-State Polymerization, J. Macromoi. Sci.—Chem., A., A1(8), pp. 1519-1529, Dec. 1967 abstract.

Mehrabzadeh at al., "Impact Modification of Polyacetal by Thermoplastic Elastomer Polyurethane", Journal of Applied Polymer Science, vol. 84, 2573-2582 (2002).

Co-pending U.S. Appl. No. 13/879,360, Larson, et al., filed Apr. 12, 2013.

\* cited by examiner

VOC OR COMPRESSED GAS CONTAINMENT DEVICE MADE FROM A POLYOXYMETHYLENE POLYMER

BACKGROUND

Fuel tanks for use in vehicles or other mobile devices should generally possess various characteristics and properties. For instance, the fuel tanks should be capable of holding a fuel without significant amounts of fuel vapor escaping. The tanks should also be chemically resistant to the fuel that is contained in the tanks. The fuel tanks should also have good impact resistance properties. In the past, conventional fuel tanks were generally made from a metal.

In the relatively recent past, those skilled in the art have attempted to design fuel tanks made from polymers. For instance, many small fuel tanks, such as those used by small off-road vehicles and devices, are currently made from high density polyethylene. High density polyethylene has good impact strength resistance properties. The above polymer, however, has a tendency to release fuel vapors over time. Consequently, fuel tanks made from high density polyethylene are typically fluorinated which not only adds significant cost to the product but is also shown to produce inconsistent results. Thus, those skilled in the art have been seeking to produce polymer fuel tanks from other types of polymers.

In this regard, those skilled in the art have proposed using polyester polymers to produce fuel tanks, particularly small fuel tanks. For instance, in U.S. Patent Application Publication No. 2006/0175325, which is incorporated herein by reference, an impact modified polyester is disclosed which comprises a polyester combined with an olefin-vinyl alcohol component and an impact modifier component.

Another type of polymer that has good permeability resistance properties are polyoxymethylene polymers. Although standard polyoxymethylene polymers have good permeability resistance, the polymers tend to have insufficient impact strength for fuel tank applications due to the high crystallinity of the material. The impact strength of polyoxymethylene polymers can be improved by incorporating an impact modifier into the material. It is known, however, that incorporating an impact modifier into a polyoxymethylene polymer can significantly increase the permeability properties of the polymer. Thus, problems have been encountered in being able to develop a polymer material containing a polyoxymethylene polymer for use in producing fuel tanks.

In U.S. Patent Application Publication No. 2009/0220719, which is incorporated herein by reference, a low fuel-permeable thermoplastic vessel is described made from a polyoxymethylene polymer in combination with an impact modifier. The '719 application teaches using an "uncompatibilized" blend of a polyoxymethylene, a thermoplastic polyurethane, and a copolyester. The term "uncompatibilized" as used in the '719 application means that the compositions do not contain polymer compatibilizers.

Although the teachings of the '719 application have provided great advancements in the art, further improvements are still needed.

SUMMARY

The present disclosure is generally directed to volatile organic compound ("VOC") and compressed gas containment devices made from a composition containing a polyoxymethylene polymer. The polyoxymethylene polymer composition is formulated to have a unique combination of properties making it well suited for use in constructing various hollow vessels, especially fuel tanks. For instance, the polymer composition not only has very good impact strength resistance properties, but is also well suited to preventing fuel vapors and gases from escaping the containment device over time. In particular, the polymer composition can be formulated so as to reduce or prevent VOC vapor emissions while still providing a fuel tank that is capable of not rupturing, even when subjected to relatively high impact forces at colder temperatures.

In this regard, in one embodiment, the present disclosure is directed to a containment device, such as a container, comprising an opening configured to receive a VOC or a compressed gas, such as a fuel. The containment device may also include a discharge for feeding the fuel to a combustion engine or other similar device. The containment device includes a volume surrounded by a wall.

In accordance with the present disclosure, the wall is made from a polymer composition comprising a polyoxymethylene polymer. More particularly, the polyoxymethylene polymer for use in the composition comprises a polyoxymethylene in which at least 50% of the terminal groups are hydroxyl groups. For instance, at least about 70% of the terminal groups can be hydroxyl groups, such as at least about 80% of the terminal groups can be hydroxyl groups, such as even greater than about 85% of the terminal groups can be hydroxyl groups. In addition, the polyoxymethylene polymer contains little or no low molecular weight constituents having a molecular weight below 10,000 dalton. For instance, the polyoxymethylene polymer can contain low molecular weight constituents in an amount less than about 10% by weight, such as in an amount less than about 5% by weight, such as in an amount less than about 3% by weight, based on the total mass of polyoxymethylene.

In addition to a polyoxymethylene polymer, the composition further includes an impact modifier that is attached to the polyoxymethylene polymer. The impact modifier may comprise, for instance, a thermoplastic elastomer, such as a thermoplastic polyurethane elastomer. A coupling agent may be used to couple the impact modifier to the polyoxymethylene polymer. The coupling agent, for instance, may comprise an isocyanate. For example, in one embodiment, the coupling agent may comprise methylenediphenyl 4,4'-diisocyanate.

In accordance with the present disclosure, the amount of low molecular weight constituents contained in the polyoxymethylene polymer, the amount of impact modifier, and the amount of the coupling agent are carefully controlled so that the resulting composition produces a polymer having good impact strength resistance in combination with low permeability properties. For instance, in one embodiment, the polymer composition can have a multi axial impact strength resistance at −30° C. of greater than about 4 ftlb-f, such as greater than about 10 ftlb-f, such as greater than about 15 ftlb-f, when tested according to ASTM Test D3763.

The permeation of the polymer composition, on the other hand, can be less than about 5 g mm/m$^2$ day at 40° C. when tested according to SAE Test J2665. For instance, the permeation can be less than about 4 g mm/m$^2$ day, such as less than about 3 g mm/m$^2$ day, such as even less than about 2.5 g mm/m$^2$ day. When tested with a 2 mm wall thickness, for instance, the permeation can be less than about 2.5 g/m$^2$ day, such as less than 2 g/m$^2$ day, such as even less than 1.5 g/m$^2$ day.

As described above, the polyoxymethylene polymer contains relatively low amounts of low molecular weight constituents. In one embodiment, the polyoxymethylene polymer can be produced with relatively low amounts of low molecular weight constituents by using a heteropoly acid catalyst.

The amount of polyoxymethylene polymer contained in the composition can generally be from about 50% to about 95% by weight, such as greater than about 65% by weight, such as greater than about 70% by weight. The impact modifier, on the other hand, can generally be present in an amount from about 5% by weight to about 30% by weight, such as from about 10% by weight to about 25% by weight. The coupling agent, on the other hand, can generally be present in an amount less than about 5% by weight, such as in an amount from about 0.2% to about 3% by weight.

Although the polymer composition is suitable for producing all types of containment devices for VOC's and compressed gases, in one embodiment, a fuel tank is constructed having a fuel capacity of generally less than about five gallons. Of particular advantage, the fuel tank can be comprised of only a monolayer of the polymer composition. The container wall can generally have a thickness of from about 0.5 mm to about 10 mm, such as from about 1.5 mm to about 5 mm.

Any suitable molding process may be used to produce the containment device. For instance, in one embodiment, the containment device is blow molded. In an alternative embodiment, however, the containment device is injection molded. For instance, two different portions of the containment device may be injection molded and then later welded together.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to polymer compositions containing a polyoxymethylene polymer that are particularly well suited to molding articles, such as VOC and compressed gas containment devices. As will be described in greater detail below, the polyoxymethylene polymer composition is formulated in a manner that produces molded articles with very good impact resistance properties in combination with very good permeability properties. In particular, the polymer composition is capable of producing molded articles that are relatively impermeable to gas vapors, such as fuel vapors and other volatile organic compounds, and impermeable to compressed gases, such as natural gas, propane, and other hydrocarbon gases.

In the past, various problems were encountered in producing fuel tanks from polyoxymethylene polymers. Although polyoxymethylene polymers have good natural permeability properties, the materials tend not to have acceptable impact strength when used in fuel tank applications due to the high crystallinity of the material. Increasing the impact strength with compatibilized impact modifiers was found to adversely affect the permeability properties of the material. It was unexpectedly discovered, however, that by using a polyoxymethylene polymer with a high concentration of hydroxyl end groups and with a low concentration of low molecular weight fractions in combination with an impact modifier that can be chemically reacted with or otherwise attached to the polyoxymethylene polymer, a polymeric material can be produced that has the desired balance of properties with respect to impact strength and permeability.

Although the polymer composition of the present disclosure can be used to produce any suitable type of VOC or compressed gas containment device, the polymer composition is particularly well suited to producing fuel tanks for a category of engines referred to as small off-road engines. Such engines typically have a power rating of up to 25 horsepower and are used in various vehicles and mobile devices. For instance, small off-road engines are typically used in small utility equipment, lawn mowers, weed trimmers, chain saws, motorcycles, lawn tractors, blowers, and the like. Such fuel tanks typically have a fuel capacity of less than 20 gallons, and particularly less than 5 gallons.

It should be understood, however, that other products and articles in addition to fuel tanks may be made in accordance with the present disclosure. In particular, any type of VOC or compressed gas containment device may be made in accordance with the present disclosure. As used herein, a "containment device" refers to any hollow article that is designed to contain or in any way come in contact with VOCs and/or compressed gases. In addition to tanks, for instance, a containment device may comprise a tube, a hose, or any other similar device. The containment device, for instance, may be designed to contact or contain hydrocarbon fluids, pesticides, herbicides, brake fluid, paint thinners, and various compressed hydrocarbon gases, such as natural gas, propane, and the like. When used as a fuel tank, the containment device may contact or contain any suitable hydrocarbon fluid, whether liquid or gas.

Figure 1:
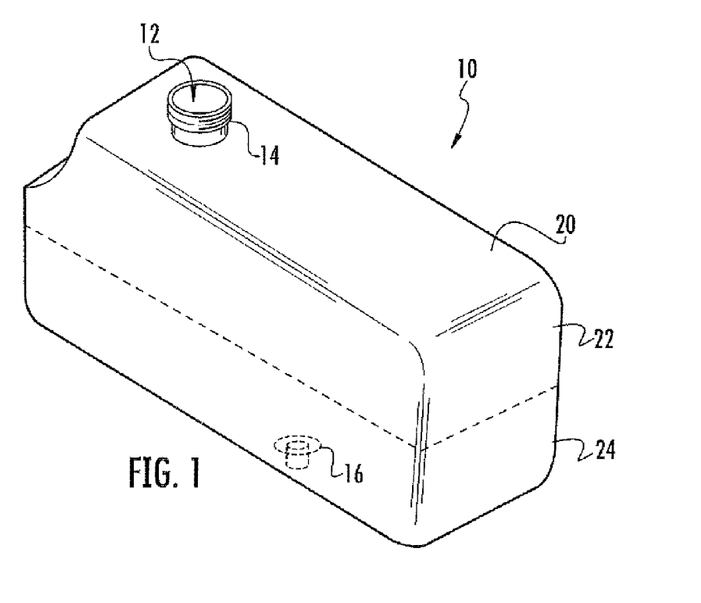
FIG. 1 is a perspective view of one embodiment of a fuel tank made in accordance with the present disclosure.
Figure 2:
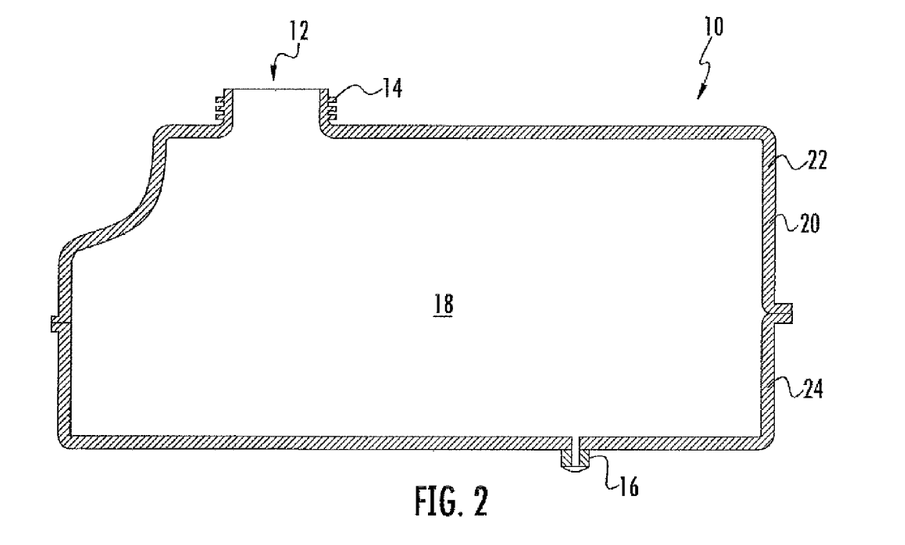
FIG. 2 is a cross sectional view of the fuel tank illustrated in FIG. 1.

Referring to FIGS. 1 and 2, for instance, one embodiment of a fuel tank 10 that may be made in accordance with the present disclosure is shown. The fuel tank 10 includes an opening or inlet 12 for receiving a fuel. The opening 12 can be defined by a threaded fixture 14. The threaded fixture 14 is adapted for receiving a fuel and for receiving a cap (not shown). A cap can be placed over the threaded fixture 14, for instance, in order to prevent fuel and vapors from leaving the fuel tank 10.

The fuel tank 10 further includes at least one outlet 16 for feeding a fuel to a combustion device, such as an engine.

The fuel tank 10 defines a container volume 18 for receiving a fuel. The container volume 18 is surrounded by a container wall 20. The container wall 20 can include multiple sides. For instance, the container wall can include a top panel, a bottom panel, and four side panels. Alternatively, the fuel tank 10 can have a spherical shape, a cylindrical shape, or any other suitable shape.

In accordance with the present disclosure, the fuel tank 10 is made from a polymer composition containing a polyoxymethylene polymer. Of particular advantage, the polymer composition is capable of forming a monolayer tank without having to apply any further coatings or layers to the container wall for increasing either impact resistance or permeability resistance.

For instance, polyoxymethylene polymer compositions made in accordance with the present disclosure can have a permeation of less than 5 g mm/m² per day at 40° C. when tested according to SAE Test J2665. SAE Test J2665 tests the permeability of the material with a test fuel comprising 10% ethanol, 45% toluene, and 45% iso-octane. Determination of the steady-state flux reported in gmm/m² per day is carried out per SAE Test J2665, Section 10. In certain embodiments, the polymer composition is capable of producing a polymer material having a permeation of less than 4 g mm/m² per day, such as less than 3 g mm/m² per day, such as even less than 2.5 g mm/m² per day.

When tested according to a 2 mm wall thickness, such as according to SAE Test J2665, Section 11, the polymer composition of the present disclosure may have a permeation of less than about 2.5 g/m² per day, such as less than 2 g/m² per day, such as even less than 1.5 g/m² per day.

In addition to having excellent permeability properties, as described above, the polymer composition formulated according to the present disclosure also displays excellent impact strength resistance. For instance, the polymer composition may have a multi axial impact strength at −30° C. according to ASTM Test D3763 of greater than 4 ftlb-f, such as greater than 10 ftlb-f, such as greater than 15 ftlb-f. The multi axial impact strength is generally less than 60 ftlb-f, such as from about 5 ftlb-f to about 25 ftlb-f.

Since the polyoxymethylene polymer is a thermoplastic polymer, the fuel tank 10 as shown in FIGS. 1 and 2 can be made according to different processes. For instance, in one embodiment, the fuel tank 10 can be formed through a blow molding process. Alternatively, rotational molding or injection molding may be used to produce the tank.

In one particular embodiment, different portions of the fuel tank 10 can be made using injection molding. For instance, as shown in FIGS. 1 and 2, the fuel tank 10 may be formed from a first portion or half 22 and a second portion or half 24. The first portion 22 can then be attached to the second portion 24 using any suitable welding process. Such welding processes include hot-plate welding, vibration welding, laser welding, or ultrasonic welding.

The polymer composition of the present disclosure generally contains a polyoxymethylene polymer that is chemically reacted with or attached to an impact modifier. For example, in one embodiment, a coupling agent may be present in the composition that couples the impact modifier to the polyoxymethylene polymer. More particularly, the coupling agent may react with first reactive groups on the polyoxymethylene polymer and with second reactive groups present on the impact modifier. In one embodiment, for instance, the coupling agent may comprise an isocyanate that chemically attaches the impact modifier to the polyoxymethylene polymer.

The polyoxymethylene polymer used in the polymer composition may comprise a homopolymer or a copolymer. The polyoxymethylene polymer, however, generally contains a relatively high amount of reactive groups, such as hydroxyl groups in the terminal positions. More particularly, the polyoxymethylene polymer can have terminal hydroxyl groups, for example hydroxyethylene groups and/or hydroxyl side groups, in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

In one embodiment, the polyoxymethylene polymer has a content of terminal hydroxyl groups of at least 5 mmol/kg, such as at least 10 mmol/kg, such as at least 15 mmol/kg. In one embodiment, the terminal hydroxyl group content ranges from 18 to 50 mmol/kg.

In addition to the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of —CH₂O-repeat units.

In addition to having a relatively high terminal hydroxyl group content, the polyoxymethylene polymer according to the present disclosure also has a relatively low amount of low molecular weight constituents. As used herein, low molecular weight constituents (or fractions) refer to constituents having molecular weights below 10,000 dalton. In order to produce a polymer having the desired permeability requirements, the present inventors unexpectedly discovered that reducing the proportion of low molecular weight constituents can dramatically improve the permeability properties of the resulting material, when attached to an impact modifier. In this regard, the polyoxymethylene polymer contains low molecular weight constituents in an amount less than about 10% by weight, based on the total weight of the polyoxymethylene. In certain embodiments, for instance, the polyoxymethylene polymer may contain low molecular weight constituents in an amount less than about 5% by weight, such as in an amount less than about 3% by weight, such as even in an amount less than about 2% by weight.

The preparation of the polyoxymethylene can be carried out by polymerization of polyoxymethylene-forming monomers, such as trioxane or a mixture of trioxane and dioxolane, in the presence of ethylene glycol as a molecular weight regulator. The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted. The above-described procedure for the polymerization can lead to polymers having comparatively small proportions of low molecular weight constituents. If a further reduction in the content of low molecular weight constituents were to be desired, this can be effected by separating off the low molecular weight fractions of the polymer after the deactivation and the degradation of the unstable fractions after treatment with a basic protic solvent. This may be a fractional precipitation from a solution of the stabilized polymer; polymer fractions of different molecular weight distribution being obtained.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one particular embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than about 2% by weight.

A heteropoly acid refers to polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

$$H_x[M_mM'_nO_z]/yH_2O$$

wherein
M represents an element selected from the group consisting of P, Si, Ge, Sn, As, Sb, U, Mn, Re, Cu, Ni, Ti, Co, Fe, Cr, Th or Ce,
  M' represents an element selected from the group consisting of W, Mo, V or Nb,
m is 1 to 10,
n is 6 to 40,
z is 10 to 100,
x is an integer of 1 or above, and
y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

$$(ROOC)-(CH_2)_n-(COOR')$$

wherein
n is an integer from 2 to 12, preferably 3 to 6 and
R and R' represent independently from each other an alkyl group having 1 to 4 carbon atoms, preferably selected from the group consisting of methyl, ethyl, n-propyl, iso-propyl, n-butyl, iso-butyl and tert.-butyl.

In one embodiment, the polybasic carboxylic acid comprises the dimethyl or diethyl ester of the above-mentioned formula, such as a dimethyl adipate (DMA).

The alkyl ester of the polybasic carboxylic acid may also be represented by the following formula:

$$(ROOC)_2-CH-(CH_2)_m-CH-(COOR')_2$$

wherein
m is an integer from 0 to 10, preferably from 2 to 4 and
R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 weight percent, preferably in an amount ranging from 0.01 to 5 weight percent, wherein the weight is based on the entire solution.

In some embodiments, the polymer composition of the present disclosure may contain other polyoxymethylene homopolymers and/or polyoxymethylene copolymers. Such polymers, for instance, are generally unbranched linear polymers which contain as a rule at least 80%, such as at least 90%, oxymethylene units. Such conventional polyoxymethylenes may be present in the composition as long as the resulting mixture maintains the above amounts of hydroxyl terminated groups and the above amounts of low molecular weight constituents.

The polyoxymethylene polymer present in the composition can generally have a melt volume rate (MVR) of less than 50 cm³/10 min, such as from about 1 to about 40 cm³/10 min, determined according to ISO 1133 at 190° C. and 2.16 kg.

The amount of polyoxymethylene polymer present in the polymer composition of the present disclosure can vary depending upon the particular application. In one embodiment, for instance, the composition contains polyoxymethylene polymer in an amount of at least 50% by weight, such as in an amount greater than about 60% by weight, such as in an amount greater than about 65% by weight, such as in an amount greater than about 70% by weight. In general, the polyoxymethylene polymer is present in an amount less than about 95% by weight, such as in an amount less than about 90% by weight, such as in an amount less than about 85% by weight.

As described above, in addition to a polyoxymethylene polymer, the composition also contains an impact modifier and a coupling agent if needed for an attachment to occur. The impact modifier may comprise a thermoplastic elastomer. In general, any suitable thermoplastic elastomer may be used according to the present disclosure as long as the thermoplastic elastomer can attach to the polyoxymethylene polymer whether through the use of a coupling agent or otherwise. In one embodiment, for instance, the thermoplastic elastomer may include reactive groups that directly or indirectly attach to reactive groups contained on the polyoxymethylene polymer. For instance, in one particular embodiment, the thermoplastic elastomer has active hydrogen atoms which allow for covalent bonds to form with the hydroxyl groups on the polyoxymethylene using the coupling agent.

Thermoplastic elastomers are materials with both thermoplastic and elastomeric properties. Thermoplastic elastomers include styrenic block copolymers, polyolefin blends referred to as thermoplastic olefin elastomers, elastomeric alloys, thermoplastic polyurethanes, thermoplastic copolyesters, and thermoplastic polyamides.

Thermoplastic elastomers well suited for use in the present disclosure are polyester elastomers (TPE-E), thermoplastic polyimide elastomers (TPE-A) and in particular thermoplastic polyurethane elastomers (TPE-U). The above thermoplastic elastomers have active hydrogen atoms which can be reacted with the coupling reagents and/or the polyoxymethylene polymer. Examples of such groups are urethane groups, amido groups, amino groups or hydroxyl groups. For instance, terminal polyester diol flexible segments of thermoplastic polyurethane elastomers have hydrogen atoms which can react, for example, with isocyanate groups.

In one particular embodiment, a thermoplastic polyurethane elastomer is used as the impact modifier either alone or in combination with other impact modifiers. The thermoplastic polyurethane elastomer, for instance, may have a soft segment of a long-chain diol and a hard segment derived from a diisocyanate and a chain extender. In one embodiment, the polyurethane elastomer is a polyester type prepared by reacting a long-chain diol with a diisocyanate to produce a polyurethane prepolymer having isocyanate end groups, followed by chain extension of the prepolymer with a diol chain extender. Representative long-chain diols are polyester diols such as polybutylene adipate)diol, polyethylene adipate)diol and poly(ϵ-caprolactone)diol; and polyether diols such as poly(tetramethylene ether)glycol, polypropylene oxide)glycol and polyethylene oxide)glycol. Suitable diisocyanates include 4,4'-methylenebis(phenyl isocyanate), 2,4-toluene diisocyanate, 1,6-hexamethylene diisocyanate and 4,4'-methylenebis-(cycloxylisocyanate). Suitable chain extenders are $C_2$-$C_6$ aliphatic diols such as ethylene glycol, 1,4-butanediol, 1,6-hexanediol and neopentyl glycol. One example of a thermoplastic polyurethane is characterized as essentially poly (adipic acid-co-butylene glycol-co-diphenylmethane diisocyanate).

The amount of impact modifier contained in the polymer composition used to form the containment device can vary depending on many factors. The amount of impact modifier present in the composition may depend, for instance, on the desired permeability of the resulting material and/or on the amount of coupling agent present and the amount of terminal hydroxyl groups present on the polyoxymethylene polymer. In general, one or more impact modifiers may be present in the composition in an amount greater than about 5% by weight, such as in an amount greater than about 10% by weight. The impact modifier is generally present in an amount less than 30% by weight, such as in an amount less than about 25% by weight, such as in an amount up to about 18% by weight in order to provide sufficient impact strength resistance while preserving the permeability properties of the material.

The coupling agent present in the polymer composition comprises a coupling agent capable of coupling the impact modifier to the polyoxymethylene polymer. In order to form bridging groups between the polyoxymethylene polymer and the impact modifier, a wide range of polyfunctional, such as trifunctional or bifunctional coupling agents, may be used. The coupling agent may be capable of forming covalent bonds with the terminal hydroxyl groups on the polyoxymethylene polymer and with active hydrogen atoms on the impact modifier. In this manner, the impact modifier becomes coupled to the polyoxymethylene through covalent bonds.

In one embodiment, the coupling agent comprises a diisocyanate, such as an aliphatic, cycloaliphatic and/or aromatic diisocyanate. The coupling agent may be in the form of an oligomer, such as a trimer or a dimer.

In one embodiment, the coupling agent comprises a diisocyanate or a triisocyanate which is selected from 2,2'-, 2,4'-, and 4,4'-diphenylmethane diisocyanate (MDI); 3,3'-dimethyl-4,4'-biphenylene diisocyanate (TODD; toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl)cyclohexane, m-phenylene diisocyanate, m-xylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3-'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

In one embodiment, an aromatic polyisocyanate is used, such as 4,4'-diphenylmethane diisocyanate (MDI).

The polymer composition generally contains the coupling agent in an amount from about 0.1% to about 10% by weight. In one embodiment, for instance, the coupling agent is present in an amount greater than about 1% by weight, such as in an amount greater than 2% by weight. In one particular embodiment, the coupling agent is present in an amount from about 0.2% to about 5% by weight. To ensure that the impact modifier has been completely coupled to the polyoxymethylene polymer, in one embodiment, the coupling agent can be added to the polymer composition in molar excess amounts when comparing the reactive groups on the coupling agent with the amount of terminal hydroxyl groups on the polyoxymethylene polymer.

In one embodiment, a formaldehyde scavenger may also be included in the composition. The formaldehyde scavenger, for instance, may be amine-based and may be present in an amount less than about 1% by weight.

The polymer composition of the present disclosure can optionally contain a stabilizer and/or various other known additives. Such additives can include, for example, antioxidants, acid scavengers, UV stabilizers or heat stabilizers. In addition, the molding material or the molding may contain processing auxiliaries, for example adhesion promoters, lubricants, nucleating agents, demolding agents, fillers, reinforcing materials or antistatic agents and additives which impart a desired property to the molding material or to the molding, such as dyes and/or pigments.

In general, other additives can be present in the polymer composition in an amount up to about 10% by weight, such as from about 0.1% to about 5% by weight, such as from about 0.1 to about 2% by weight.

When forming containment devices in accordance with the present disclosure, the above described components can be melt blended together, which automatically causes the reaction to occur between the coupling agent, the polyoxymethylene polymer, and the impact modifier. As described above, the coupling agent reacts with the reactive end groups on the polyoxymethylene polymer and the reactive groups on the impact modifier. The reaction between the components can occur simultaneously or in sequential steps. In one particular embodiment, the components in the composition are mixed together and then melt blended in an extruder.

The reaction of the components is typically effected at temperatures of from 100 to 240° C., such as from 150 to 220° C., and the duration of mixing is typically from 0.5 to 60 minutes.

The proportion of coupling agent in relation to the other components can be chosen within wide limits. For instance, the coupling agent may be used in an amount such that there are from 0.2 to 5 mol, preferably from 0.5 to 4 mol, of the coupling agent per mole of active hydrogen atoms, for example in the form of hydroxyl groups, of the polyoxymethylene containing active hydrogen atoms.

In one embodiment, the molding composition of the present disclosure is reacted together and compounded prior to being used in a molding process. For instance, in one embodiment, the different components can be melted and mixed together in a conventional single or twin screw extruder at a temperature described above. Extruded strands may be produced by the extruder which are then pelletized. Prior to compounding, the polymer components may be dried to a moisture content of about 0.05 weight percent or less. If desired, the pelletized compound can be ground to any suitable particle size, such as in the range of from about 100 microns to about 500 microns.

As described above, the formation of VOC and compressed gas containment devices in accordance with the present disclosure can be done using any suitable molding process, such as blow molding, rotational molding, or injection molding. In one particular embodiment, injection molding is used to form the containment devices. For instance, a plurality of portions of the containment devices can be first produced and then welded together.

When injection molding, the pre-compounded composition or the individual components can be fed to a heated barrel, mixed and forced into a mold cavity. The heated barrel may comprise a single screw extruder or a twin screw extruder. While in the barrel, the composition is heated to a temperature sufficient to form a molten mixture that flows. Once forced into a mold cavity, the polymer composition cools and hardens producing the desired part. In one embodiment, injection molding can be gas assisted. For instance, non-reactive gases, such as nitrogen or supercritical gases can be used to place pressure on the molten material for forcing the material against the walls of the mold. In other embodiments, however, no such gas is needed to obtain the pressures necessary during injection into the mold.

After the portions or parts of the containment device are molded, the different portions are then attached together. In one embodiment, for instance, any suitable welding process may be used to attach the portions together. For example, the portions may be attached together using laser welding, ultrasonic welding, linear vibration, orbital vibration, hot plate welding, or spin welding. During laser welding, the components are subjected to electromagnetic radiation at wavelengths that causes absorption. The absorption of the electromagnetic radiation results in heating and melting at the interface of the components causing the different parts to join together.

During linear vibration, heat is generated by moving one part against another under pressure through a linear displacement in the plane of the joint. When a molten state is reached at the joint interface, vibration is stopped and clamping pressure is maintained until a bond is formed between the parts. Orbital vibration is similar to linear vibration only an electromagnetic drive is used to create relative motion between the two thermoplastic portions. This constant velocity motion generates heat and causes the two parts to bond together.

During hot plate welding, a heated platen assembly is introduced between the two portions to be joined together. Once the interface polymer on each part is melted or softened, the heated platen is withdrawn and the parts are clamped together.

Spin welding is a process that joins circular thermoplastic parts by bringing the part interfaces together under pressure with a circular spinning motion. One of the portions is typically held stationary in a fixture while the other is rotated against it under pressure. The frictional heat that is generated causes the part interfaces to melt and fuse together.

In one particular embodiment, the different parts or portions of the containment device are bonded together using ultrasonic welding. During ultrasonic welding, an ultrasonic tool called a horn transfers vibratory energy through one or both parts at the interface. The vibratory energy is converted into heat through friction which causes the parts to bond together when pressure is applied. More particularly, during ultrasonic welding, one or more of the parts can be held between an anvil and the horn, which is connected to a transducer. Typically, a low-amplitude acoustic vibration is emitted. The frequency used during ultrasonic welding can generally be from about 10 kHz to about 100 kHz.

The present disclosure may be better understood with reference to the following example.

Example

The following experiments were conducted in order to show some of the benefits and advantages of compositions made according to the present disclosure.

First, polyoxymethylene polymers were prepared using cationic polymerization with ethylene glycol as the chain terminating agent, followed by solution hydrolysis. One of the polyoxymethylene polymers (Sample No. 1) was made using a conventional catalyst, namely boron trifluoride ($BF_3$). For purposes of comparison, a polyoxymethylene polymer (Sample No. 2) was produced using a heteropoly acid (HPA) as a catalyst.

The polymer feed composition for Sample Nos. 1 and 2 are included in the following table.

TABLE 1

| Sample No. | Trioxane wt % | Dioxolane wt % | Ethylene Glycol ppm | HPA Catalyst ppm | BF3 Catalyst ppm |
|---|---|---|---|---|---|
| 1 | 96.4 | 3.5 | 700 | 0 | 21 |
| 2 | 96.4 | 3.5 | 700 | 2 | 0 |

The molecular weight distribution of the polyoxymethylene samples was determined by GPC. Each sample was dissolved (~30 minutes at 40° C., under $N_2$ (g)) in distilled hexafluoroisopropanol (HFIP) buffered with potassium trifluoroacetate. The samples were closely monitored and removed from heating as soon as the material was dissolved. The solution was filtered through a 0.45 uM PTFE filter.

The analysis was performed at 40° C. using HFIP w/ TEAN as the mobile phase on a Waters 2695 separations unit coupled with a Waters 2410 refractive index (RI) detector. Two PL-HFIP gel columns fitted with an HFIP-gel guard column were used for the separation. The data was acquired and processed with EMPOWER PRO software. The sampling conditions were as follows:

Conditions
1. Flow rate: 1.0 ml/min
2. 100 uL injection volume
3. Collection time 30 mins
4. Multiple injections
5. Calibrated vs. well known PMMA standards The end group analysis for the polyoxymethylene samples was determined by NMR. The samples were prepared by silylation prior to being tested. A solution of 0.84 mL BSTFA and 63 μL pyridine (anhydrous) was added under nitrogen to a 10 mL vial fitted with TEFLON septum.

The solution was heated to 45° C. in a sample preparation unit with agitation. A second solution containing 30 mg acetal and 0.6 mL 60% $CHCl_3$/40% HFIP was prepared at 45° C. The acetal solution was transferred to the BSTFA solution via a glass syringe with metal tip that was preheated in an oven to 50° C. The mixture was agitated at 45° C. for 1 hour after which time the solvent was evaporated under a stream of dry nitrogen. The white residue was re-dissolved and evaporated with dry HFIP an additional 3 times in the same manner.

The residue was dissolved at 45° C. in a HFIP-$d_2$ solution (w/0.1% pyridine). The H NMR spectrum for each sample was collected on a Bruker DMX300 spectrometer (Dual 5 mm probe, 30° pulse, D1=6 s, 256 transients, 40° C.). Peak deconvolution was performed with the Bruker TopSpin v.1.3 software.

The following results were obtained:

TABLE 2

| | Molecular Weight (wt %) | | End Group Analysis | |
|---|---|---|---|---|
| Product | Main Peak | LMWF Peak | —$C_2OH$ | —$OCH_3$ |
| Sample No. 1 | 89.9 | 10.1 | 85 | 15 |
| Sample No. 2 | 98.1 | 1.9 | 86 | 14 |

LMWF—"low molecular weight fractions"

Figure 3:
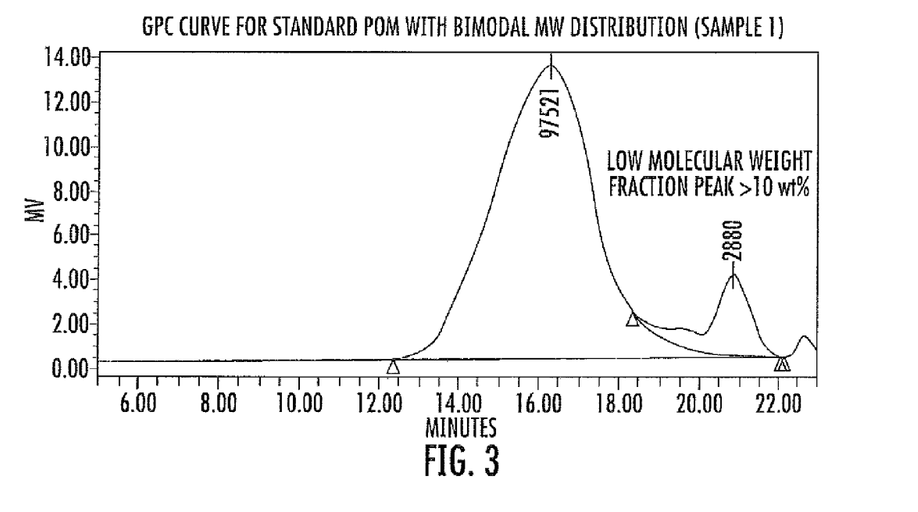
FIGS. 3 through 7 are graphical representations of the results obtained in the example below.
Figure 4:
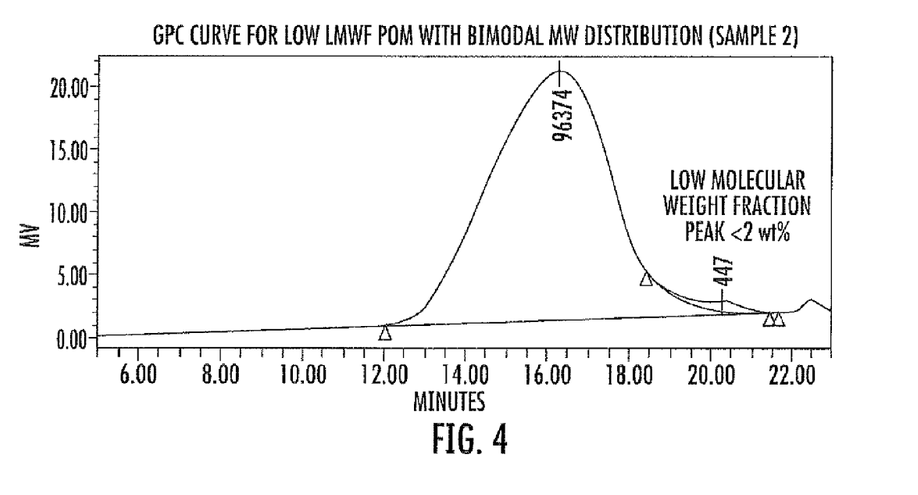

The molecular weight distribution for the polyoxymethylene polymers are also shown in FIGS. 3 and 4. A comparison of the GPC curve in FIGS. 3 and 4 demonstrates the reduction in the low molecular weight constituents that is achieved through the use of the heteropoly acid catalysts.

As shown above, the polyoxymethylene polymer made with the heteropoly acid contained less than 2% by weight low molecular weight constituents. Both polymers contained significant amounts of hydroxyl terminal groups.

The above polyoxymethylene polymers were then melt blended with an impact modifier, a coupling agent, and a stabilizer package including an antioxidant and a lubricant. The lubricant used contained a combination of ethylene bis stearamide and ethylene bis palmitamide. The antioxidant used was tetrakis-(methylene-(3,5-di-(tert)-butyl-4-hydrocinnamate))methane. The formulated compositions were melt blended using a 92 mm twin screw extruder. The extrusion conditions were as follows:

TABLE 3

| Extruder Temperatures ° C. | | | | | | | | Extruder Feed Rate (kg/hr) | Extruder Screw Speed (rpm) |
|---|---|---|---|---|---|---|---|---|---|
| Barrel Zone Number | | | | | | | | | |
| 1 | 2 | 3 | 4 | 5 | 6 | 7 | DIE | | |
| 177 | 177 | 177 | 177 | 177 | 177 | 177 | 188 | 817 | 210 |

The polymers were blended with a thermoplastic polyurethane elastomer impact modifier. In particular, the impact modifier was obtained from BASF under the trade name ELASTOLLAN. The coupling agent used was 4,4'-diphenylmethane diisocyanate. As described above, the compositions also contained a stabilizer package including an antioxidant and a lubricant.

The samples were molded for multi axial impact testing using a Roboshot 165 SiB molding machine. The test specimen was a 4" diameter disc ⅛" of an inch thick. The molding conditions are included in the following table.

TABLE 4

| Barrel Zone 1 (° C.) | 177 |
|---|---|
| Barrel Zone 2 (° C.) | 182 |
| Barrel Zone 3 (° C.) | 188 |

TABLE 4-continued

| | |
|---|---|
| Nozzle (° C.) | 193 |
| Melt (° C.) | 205 |
| Mold Movable (° C.) | 80 |
| Mold Stationary (° C.) | 80 |
| Back Pressure (psi) | 50 |
| Hold Pressure (psi) | 11600 |
| Hold Pressure (psi) | 35 |
| Cooling Time (sec) | 15 |
| Cycle Time (sec) | 50 |
| Melt Cushion (mm) | 5 |
| Injection Velocity (mm/s) | 200 |
| Injection Time (sec) | 2 |
| Screw Retraction Time (sec) | 10 |

The molded discs were tested for multi axial impact at −30° C. using ASTM method D3763. The instrument was a Dynatup 8250. The test speed was 11 ft/sec. The samples were conditioned for 24 hours at 23° C. and 50% RH prior to testing.

The permeation testing was conducted using molded discs. The discs were molded using the same molding machine (Roboshot 165 SiB) and molding conditions as the multi axial samples.

Material sample plaques were made by injection molding four inch diameter discs with an average thickness between 1/32 and 1/8 of an inch. The plaques were die cut into three inch circles in order to fit the permeation cup. The thickness of the material was measured at a minimum of five points, and the average thickness was determined from these measurements. Permeation cup test fixtures were assembled with the desired material plaque per SAE J2665, Sections 8.3 through 8.11.

Permeation values of the material were determined gravimetrically using a modified version of SAE J2665 "Cup Weight Loss Method" (Issued October 2006). Vapometer Model 68 permeation cups, commercially available from Thwing-Albert, were used as the test fixture. The cups were modified per SAE J2665 in the following manner: 1) Neoprene gaskets were replaced with FKM gaskets and 2) the six supplied knurled head screws were replaced to allow for torque wrench tightening.

Fuel CE10 was used as the test fuel (10% ethanol, 45% toluene, and 45% iso-octane). The cups were placed right-side up into a controlled thermal environment (T=40° C.±2° C.) so that the test material was in contact with only the vapor phase of the fuel. The weight of the test fixtures were measured twice a week. Weight-loss versus time was plotted using the method described in SAE J2665, Section 9. Determination of the steady-state flux, reported as [grams/(m²-day)], was carried out per SAE J2665, Section 10. Determination of the vapor transmission rate (VTR), or "permeation constant," reported as [grams-mm/(m²-day)], was carried out per SAE J2665, Section 11.

In the first set of experiments using the above procedures, permeation was tested on compositions where the impact modifier levels were varied. More particularly, a first set of compositions were formulated that are indicated below as "Sample No. 3". The Sample No. 3 compositions contained the polyoxymethylene polymer described above that contained low molecular weight constituents in an amount of greater than 10% by weight. Identical compositions were also formulated and are indicated in the table below as "Sample No. 4". The Sample No. 4 compositions contained the polyoxymethylene polymer described above that contained low molecular weight constituents in an amount less than 2% by weight.

Each of the Sample No. 3 compositions and the Sample No. 4 compositions contained the stabilizer package in an amount of 0.4% by weight and the impact modifier in the amounts listed below in Table 6. For compositions containing 18% by weight impact modifier or less, the compositions contained the coupling agent in an amount of 0.5% by weight. For the compositions containing the impact modifier in an amount of 30% by weight or more, the compositions contained the coupling agent in an amount of 0.8% by weight. The remainder of each composition was made up of the appropriate polyoxymethylene polymer. The following results were obtained:

TABLE 5

| Impact Modifier | Permeation (g mm/m²) | | % |
|---|---|---|---|
| Concentration (wt %) | Sample 3 | Sample 4 | Decrease |
| 0 | 1.09 | — | — |
| 5 | 3.24 | — | — |
| 7 | 3.73 | — | — |
| 9 | 4.95 | 2.57 | 48.1% |
| 12 | — | 3.45 | — |
| 14 | 6.36 | 4.64 | 27.0% |
| 18 | 8.46 | 5.73 | 32.3% |
| 30 | 34.53 | 27.25 | 21.1% |
| 38 | 42.02 | 27.44 | 34.7% |

— Not analyzed.
Compositions indicated as "Sample 3" above contained polyoxymethylene polymer that included low molecular weight constituents in an amount greater than 10% by weight.
Compositions indicated as "Sample 4" above contained polyoxymethylene polymer that included low molecular weight constituents in an amount less than 2% by weight.

Figure 5:
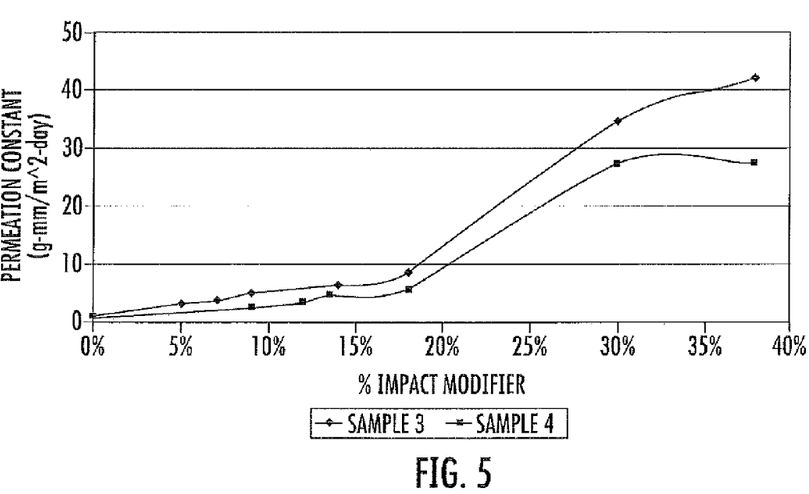
Figure 6:
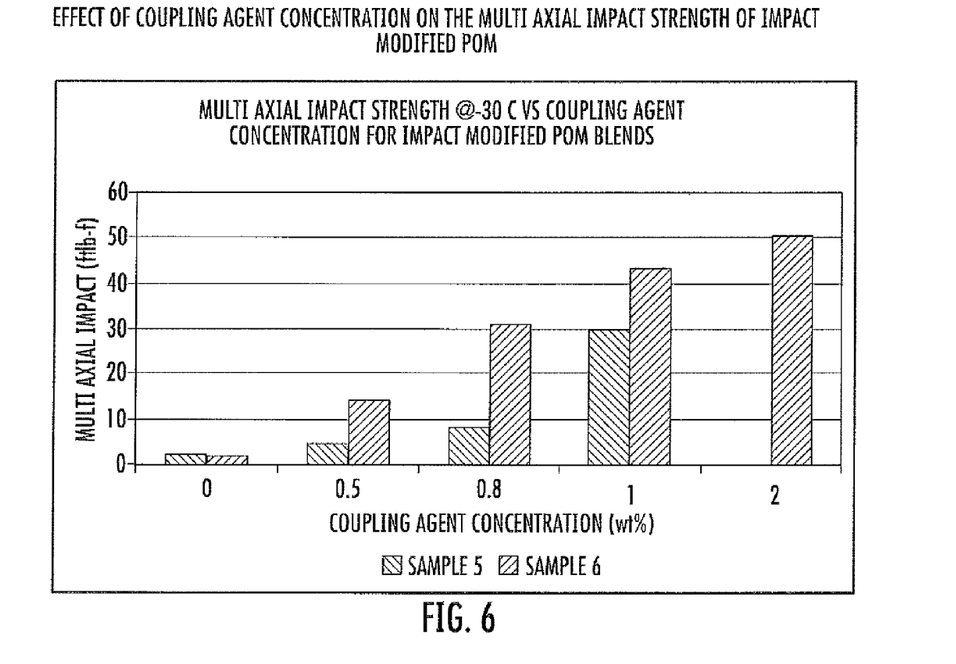

The above results are also graphically shown in FIG. 5.

The data above illustrates the dramatic and unexpected reduction in permeability for the Sample 4 compositions containing the polyoxymethylene polymer having low levels of low molecular weight constituents. For instance, permeation decreased by greater than 30% on average when using the polyoxymethylene polymer containing low amounts of low molecular weight constituents.

It is believed that the lower permeability of the polyoxymethylene polymer containing low amounts of low molecular weight constituents allows the impact modifier concentration to be increased, while still maintaining the permeability performance of the material. The permeation data at a 2 mm wall thickness for compositions made according to Sample No. 3 and compositions made according to Sample No. 4 are shown below.

TABLE 6

| Impact Modifier | Permeation @ 2 mm Wall Thickness (g/m² day) | |
|---|---|---|
| (wt %) | Sample 3 | Sample 4 |
| 0 | 0.55 | — |
| 9 | 2.48 | 1.29 |
| 18 | 4.23 | 2.87 |

—Not analyzed

Figure 7:
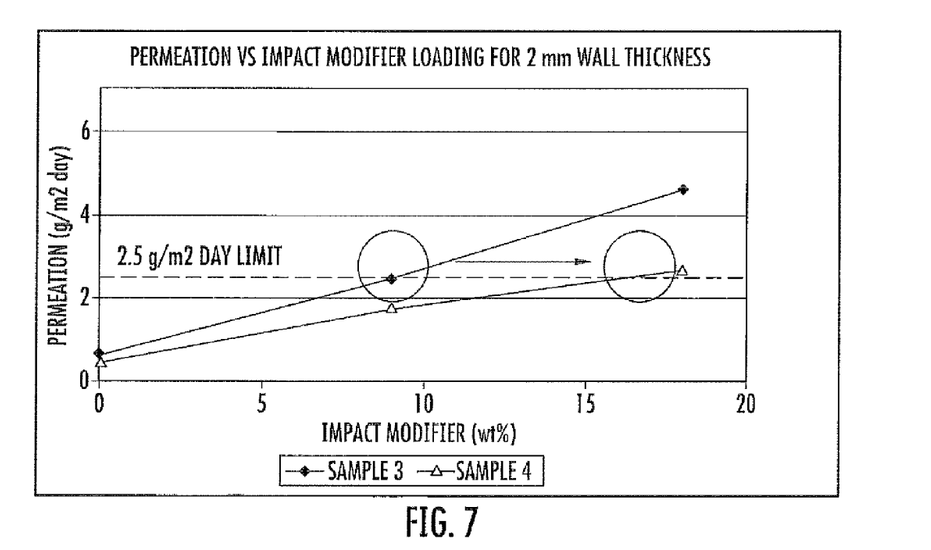

Currently, most fuel tanks require that the material used to form the tank have a permeation of no greater than 2.5 g/m² day. The above results are also graphically illustrated in FIG. 7.

The following experiments were conducted to show how multi axial impact strength changes based on the amount of coupling agent present in the composition. Multi axial impact strength is measured at −30° C.

The following compositions were formulated:

TABLE 7

| Sample No. | Sample 1 POM | Sample 2 POM | Impact Modifier | Coupling Agent | Stabilizer |
|---|---|---|---|---|---|
| 5 | 90.7 | 0.0 | 9.0 | 0.0 | 0.4 |
| 5 | 90.2 | 0.0 | 9.0 | 0.5 | 0.4 |
| 5 | 89.9 | 0.0 | 9.0 | 0.8 | 0.4 |
| 5 | 89.7 | 0.0 | 9.0 | 1.0 | 0.4 |
| 6 | 81.7 | 0.0 | 18.0 | 0.0 | 0.4 |
| 6 | 81.2 | 0.0 | 18.0 | 0.5 | 0.4 |
| 6 | 80.9 | 0.0 | 18.0 | 0.8 | 0.4 |
| 6 | 80.7 | 0.0 | 18.0 | 1.0 | 0.4 |
| 6 | 79.7 | 0.0 | 18.0 | 2.0 | 0.4 |

As shown above, all of the "Sample No. 5" compositions and all of the "Sample No. 6" compositions were formulated using the polyoxymethylene polymer that contained the low molecular weight constituents in an amount greater than 10% by weight. The compositions made according to Sample No. 5 contained an impact modifier in an amount of 9% by weight, while the compositions formulated according to Sample No. 6 contained the impact modifier in an amount of 18% by weight.

The following results were obtained:

TABLE 8

| Coupling Agent Concentration | Multi Axial Impact Strength @ −30° C. (ftlb-f) | |
|---|---|---|
| (wt %) | Sample 5 | Sample 6 |
| 0.0 | 2.3 | 2.0 |
| 0.5 | 4.7 | 14.0 |
| 0.8 | 8.3 | 31.2 |
| 1.0 | 29.6 | 43.2 |
| 2.0 | — | 50.3 |

— Not analyzed

As shown above, the cold temperature multi axial impact strength increases significantly as the coupling agent concentration increases and as the impact modifier amount increases. The above shows that the impact strength of the material can be increased by increasing the concentration of the coupling agent.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A containment device comprising:
an opening configured to receive a volatile organic compound or a compressed gas, the containment device including a volume surrounded by a wall;
and wherein the wall is made from a polymer composition comprising:
a) a polyoxymethylene polymer in which at least 50% of the terminal groups are hydroxyl groups, the polyoxymethylene polymer also containing low molecular weight constituents having molecular weights below 10,000 dalton in an amount less than about 10% by weight, based on the total mass of polyoxymethylene polymer;
b) an impact modifier comprising a thermoplastic elastomer, the impact modifier being present in an amount of at least about 5% by weight, the impact modifier being chemically attached to the polyoxymethylene polymer;
(c) a coupling agent that chemically attaches the impact modifier to the polyoxymethylene polymer;
and wherein the polymer composition has a permeation of less than 5 g mm/m2 per day at 40° C. according to SAE Test J2665.

2. A containment device as defined in claim 1, wherein the coupling agent comprises an isocyanate.

3. A containment device as defined in claim 1, wherein the polymer composition has a permeation of less than about 2.5 g/m2 day when tested at a thickness of 2 mm at 40° C.

4. A containment device as defined in claim 1, wherein the polymer composition has a permeation of less than about 3 g mm/m2 per day at 40° C.

5. A containment device as defined in claim 1, wherein the containment device comprises a fuel tank that has a volumetric capacity of up to 5 gallons.

6. A containment device as defined in claim 1, wherein the wall of the containment device comprises only a monolayer of the polymer composition.

7. A containment device as defined in claim 1, wherein the wall has a thickness of from about 0.5 mm to about 10 mm.

8. A containment device as defined in claim 1, wherein the containment device includes a first portion welded to a second portion, the first and second portions being formed by injection molding the polymer composition.

9. A containment device as defined in claim 1, wherein the polymer composition further comprises a heteropoly acid.

10. A containment device as defined in claim 1, wherein the thermoplastic elastomer comprises a thermoplastic polyurethane elastomer, the thermoplastic polyurethane elastomer being present in the polymer composition in an amount from about 10% to about 30% by weight.

11. A containment device as defined in claim 1, wherein the coupling agent comprises methylenediphenyl 4,4'-diisocyanate, the methylenediphenyl 4,4'-diisocyanate being present in the polymer composition in an amount from about 0.5% to about 3% by weight.

12. A containment device as defined in claim 2, wherein the thermoplastic elastomer comprises a thermoplastic polyurethane elastomer, the thermoplastic polyurethane elastomer being present in the polymer composition in an amount from about 10% to about 25% by weight, and wherein at least 70% of the terminal groups of the polyoxymethylene polymer are hydroxyl groups, the polyoxymethylene polymer being present in the polymer composition in an amount of at least about 70% by weight, the polyoxymethylene polymer containing the low molecular weight constituents in an amount less than about 5% by weight based upon the total mass of the polyoxymethylene polymer, the wall of the containment device comprising only a monolayer of the polymer composition, the wall having a thickness of from about 1.5 mm to about 4 mm.

13. A containment device as defined in claim 12, wherein the containment device comprises a fuel tank.

14. A containment device as defined in claim 12, wherein the polymer composition further comprises a heteropoly acid.

15. An engine incorporating a fuel tank, the fuel tank comprising a containment device as defined in claim 1.

16. A containment device as defined in claim 1, wherein the polyoxymethylene polymer includes first reactive groups and the impact modifier includes second reactive groups, the coupling agent causing covalent bonding to occur between the first reactive groups on the polyoxymethylene polymer and between the second reactive groups on the impact modifier.

\* \* \* \* \*